United States Patent
Takeuchi

(10) Patent No.: US 8,368,587 B2
(45) Date of Patent: *Feb. 5, 2013

(54) IN-VEHICLE RADAR DEVICE AND COVER FOR IN-VEHICLE RADAR DEVICE

(75) Inventor: Koji Takeuchi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,515

(22) Filed: Feb. 22, 2012

(65) Prior Publication Data

US 2012/0212364 A1 Aug. 23, 2012

Related U.S. Application Data

(62) Division of application No. 12/670,558, filed as application No. PCT/JP2009/000898 on Feb. 27, 2009, now Pat. No. 8,149,157.

(51) Int. Cl.
*G01S 13/00* (2006.01)
*H01Q 1/42* (2006.01)

(52) U.S. Cl. .................................. 342/70; 343/872

(58) Field of Classification Search ............. 342/70–72; 343/872

See application file for complete search history.

(56) References Cited

U.S. PATENT DOCUMENTS

| | | | | |
|---|---|---|---|---|
| 3,420,572 A * | 1/1969 | Bisland | ................. | 180/271 |
| 5,829,782 A * | 11/1998 | Breed et al. | ................. | 280/735 |
| 5,901,978 A * | 5/1999 | Breed et al. | ................. | 280/735 |
| 6,116,639 A * | 9/2000 | Breed et al. | ................. | 280/735 |
| 6,412,813 B1 * | 7/2002 | Breed et al. | ................. | 280/735 |
| 6,489,927 B2 * | 12/2002 | LeBlanc et al. | ............... | 343/713 |
| 6,496,138 B1 * | 12/2002 | Honma | ............... | 342/70 |
| 6,674,412 B1 * | 1/2004 | Schmidt et al. | ............... | 343/872 |
| 6,736,231 B2 * | 5/2004 | Breed et al. | ............... | 180/272 |
| 6,749,218 B2 * | 6/2004 | Breed | ............... | 280/735 |
| 6,820,897 B2 * | 11/2004 | Breed et al. | ............... | 280/735 |
| 6,937,184 B2 * | 8/2005 | Fujieda et al. | ............... | 342/70 |
| 7,126,525 B2 * | 10/2006 | Suzuki et al. | ............... | 342/70 |
| 7,132,976 B2 * | 11/2006 | Shinoda et al. | ............... | 342/70 |
| 7,142,151 B2 * | 11/2006 | Suzuki et al. | ............... | 342/70 |

(Continued)

FOREIGN PATENT DOCUMENTS

| | | |
|---|---|---|
| JP | 10-194038 | 7/1998 |
| JP | 11-231041 | 8/1999 |

(Continued)

OTHER PUBLICATIONS

Office Action issued on Nov. 21, 2011 in corresponding Japanese Application No. 2010-502380 (2 pages).

(Continued)

*Primary Examiner* — Jack W Keith
*Assistant Examiner* — Peter Bythrow
(74) *Attorney, Agent, or Firm* — Oblon, Spivak, McClelland, Maier & Neustadt, L.L.P.

(57) ABSTRACT

An in-vehicle radar device which radiates electromagnetic waves and receives reflected waves, from an object, of the electromagnetic waves so as to detect a location of the object and which is mounted on a rear of a vehicle, the in-vehicle radar device including: a transmission-and-reception section that transmits the electromagnetic waves and receives the reflected waves; a detection section that detects the location of the object based on the reflected waves; and a cover member that is provided below a rear bumper of the vehicle and that covers the transmission-and-reception section in a manner that a rear surface of the cover member faces a transmission-and-reception surface of the transmission-and-reception section so as to be spaced apart therefrom.

7 Claims, 8 Drawing Sheets

U.S. PATENT DOCUMENTS

| | | | |
|---|---|---|---|
| 7,227,493 B2 * | 6/2007 | Oswald et al. | 342/70 |
| 7,408,500 B2 * | 8/2008 | Shinoda et al. | 342/70 |
| 7,486,222 B2 * | 2/2009 | Matsuoka | 342/70 |
| 7,538,714 B2 * | 5/2009 | Nishijima | 342/70 |
| 7,570,198 B2 * | 8/2009 | Tokoro | 342/70 |
| 7,588,115 B2 * | 9/2009 | Breed | 180/271 |
| 8,149,157 B2 * | 4/2012 | Takeuchi | 342/70 |
| 2001/0026237 A1 * | 10/2001 | Okai et al. | 342/70 |
| 2008/0042477 A1 * | 2/2008 | Breed | 297/216.12 |
| 2010/0085271 A1 | 4/2010 | Tajima | |

FOREIGN PATENT DOCUMENTS

| | | |
|---|---|---|
| JP | 2001/201557 | 7/2001 |
| JP | 2001/260779 | 9/2001 |
| JP | 2002/131413 | 5/2002 |
| JP | 2004/138572 | 5/2004 |
| JP | 2004-301592 | 10/2004 |
| JP | 2007-223342 | 9/2007 |
| JP | 2008-209343 | 9/2008 |
| JP | 2008-298544 | 12/2008 |
| WO | WO 2008/090846 | 7/2008 |

OTHER PUBLICATIONS

International Search Report issued Mar. 24, 2009 in PCT/JP09/000898 filed Feb. 27, 2009.

* cited by examiner

IN-VEHICLE RADAR DEVICE AND COVER FOR IN-VEHICLE RADAR DEVICE

CROSS REFERENCE TO RELATED APPLICATION

The present application is a divisional of U.S. application Ser. No. 12/670,558, filed on Jan. 25, 2010, which was the National Stage of International Application No. PCT/JP09/00898, filed on Feb. 27, 2009. application Ser. No. 12/670,558 is hereby incorporated by reference in its entirety.

TECHNICAL FIELD

The present invention relates to an in-vehicle radar device and a cover for the in-vehicle radar device, and more particularly to an in-vehicle radar device and a cover for the in-vehicle radar device which are mounted on the rear of a vehicle.

BACKGROUND ART

Conventionally, a radar device is developed which is mounted on a vehicle and detects an object around the vehicle. When such a radar device is mounted on the vehicle and exposed, there is a possibility that the radar device is weathered to cause malfunction. Further, when the radar device is mounted on the vehicle and exposed, the vehicle's appearance is likely to be defaced. Accordingly, when the radar device as described above is mounted on the vehicle, a cover for covering the radar device is mounted on the vehicle together with the radar device.

Patent Document 1 discloses the radar device as described above. The radar device disclosed in the Patent Document 1 has a radome portion through which electromagnetic waves transmitted from and received by a radar main body are transmitted. The radar main body is mounted inside a vehicle's bumper, and the above-described radome portion is formed as a part of the vehicle's bumper.

Patent Document 1: Japanese Laid-Open Patent Publication No. 11-231041

DISCLOSURE OF THE INVENTION

Problems to be Solved by the Invention

The radome portion disclosed in Patent Document 1 is mounted on the bumper of the vehicle, so that, when it rains, for example, there is a possibility that water drops, mud or the like sometimes adhere to the surface of the radome portion.

FIG. 9 is a diagram illustrating a state where water drops coming from below adhere to the radome portion of the conventional radar device mounted at the rear end portion of the vehicle. FIG. 9 is a sectional side view illustrating a radar unit 61, a radome portion 62 which covers the radar unit 61, and a bumper 63 to which the radome portion 62 is attached. The radar unit 61 is arranged inside the bumper 63 and transmits and receives electromagnetic waves at its transmission-and-reception surface 62S. In FIG. 9, a propagation region of the electromagnetic waves is indicated by a region enclosed by dashed lines. Further, in FIG. 9, water drops are schematically represented as circles, and directions from which the water drops are coming are schematically represented by arrows.

When the vehicle runs in the rain, for example, water drops are thrown up from below the bumper 63 due to a wheel rotation, an aerodynamic force or the like, the water drops sometimes adhere to the surface of the radome portion 62 as illustrated in FIG. 9. Accordingly, when the water drops adhere to the surface of the radome portion 62 in an area through which the electromagnetic waves transmitted from or received by the radar unit 61 are transmitted, the electromagnetic waves are, for example, sometimes absorbed by the water drop to result in attenuation of the electromagnetic waves. As described above, when the electromagnetic waves are attenuated, the radar unit 61 sometimes becomes unable to accurately measure a propagation distance or the like of the electromagnetic waves. That is, the conventional radar device is sometimes incapable of preventing the water drops from adhering to the radome portion, and consequently incapable of accurately detecting a location of an object which reflects the electromagnetic waves.

The present invention has been proposed in view of the above-described problem, and an object of the present invention is to provide an in-vehicle radar device which is capable of accurately detecting an object and a cover for the in-vehicle radar device.

Solution to the Problems

The present invention has the following features to achieve the object mentioned above. That is, a first aspect of the present invention is an in-vehicle radar device which radiates electromagnetic waves and receives reflected waves, from an object, of the electromagnetic waves so as to detect a location of the object. The in-vehicle radar device includes: a transmission-and-reception section that transmits the electromagnetic waves and receives the reflected waves; a detection section that detects the location of the object based on the reflected waves; and a cover member that covers the transmission-and-reception section in a manner that a rear surface of the cover member faces a transmission-and-reception surface of the transmission-and-reception section wherein the cover member includes at least: a cover portion that covers the transmission-and-reception surface; and a lower protrusion portion that is provided below the cover portion and formed so as to protrude on a surface side of the cover member with respect to the cover portion, the cover portion being formed of a material through which the electromagnetic waves are transmitted.

In a second aspect based on the first aspect, the cover member further includes an upper protrusion portion which is provided above the cover portion and formed to protrude on the surface side of the cover member with respect to the cover portion so as to prevent water drops coming from above and dirt-containing water drops coming from above from adhering to a surface of the cover portion.

In a third aspect based on the second aspect, the cover portion, the lower protrusion portion, and the upper protrusion portion are integrally formed.

In a fourth aspect based on the first aspect, the cover member is attached to a lower portion of a rear bumper of a vehicle.

In a fifth aspect based on the fourth aspect, the in-vehicle radar device further includes: crash risk determination section that determines whether or not a risk of a crash between the object and the vehicle is high based on the detected location of the object; and information section that provides information to rearward of the vehicle of the risk of a crash when the risk of a crash between the object and the vehicle is determined to be high.

In a sixth aspect based on the fourth aspect, the in-vehicle radar device further includes: crash risk determination section that determines whether or not a risk of a crash between the object and the vehicle is high based on the detected location of the object; and occupant protection section that protects an occupant in the vehicle from the risk of a crash when the risk of a crash between the object and the vehicle is determined to be high.

In a seventh aspect based on the sixth aspect, the occupant protection section protects the occupant from a crash impact when the risk of a crash between the object and the vehicle is determined to be high, by making a headrest move forward so as to hold the head of the occupant.

In an eighth aspect based on the first aspect, the cover portion is molded from a synthetic resin through which the electromagnetic waves are transmitted.

A ninth aspect is a cover for an in-vehicle radar device, the cover covering a transmission-and-reception section, which is provided on the in-vehicle radar device, for the electromagnetic waves such that a rear surface of the cover faces a transmission-and-reception surface of the transmission-and-reception section, the in-vehicle radar device radiating the electromagnetic waves and receiving reflected waves, from an object, of the electromagnetic waves so as to detect a location of the object. The cover includes at least: a cover portion that covers the transmission-and-reception surface; and a lower protrusion portion which is provided below the cover portion and formed so as to protrude on a surface side of the cover member with respect to the cover portion in order to prevent water drops from below and dirt-containing water drops from below from adhering to the surface of the cover portion, the cover portion being formed of a material through which the electromagnetic waves are transmitted.

EFFECT OF THE INVENTION

According to the first aspect, the water drops or the like thrown up from below due to a wheel rotation of the vehicle, for example, are prevented from adhering to the surface of the cover portion. Accordingly, the electromagnetic waves are prevented from being attenuated, and the location of an object is accurately detected.

According to the second aspect, the water drops such as rain drops or the like from above are prevented from adhering to the surface of the cover portion whereby the location of the object is accurately detected. Accordingly, the electromagnetic waves are prevented from being attenuated, and the location of the object is accurately detected.

According to the third aspect, as compared to a case where the cover portion, the lower protrusion portion, and the protrusion portion are separately formed and assembled, the cover member is constructed at lower cost.

According to the fourth aspect, the cover member can serve as a so-called rear under spoiler. Accordingly, the location of the object behind the vehicle can be accurately detected, as well as an excellent design and aerodynamic characteristics can be provided at low cost.

According to the fifth aspect, the risk of a crash between the vehicle and the object is accurately determined based on information of the accurately detected location of the object. Further, when another vehicle approaches from behind the vehicle, on which the in-vehicle radar device is mounted, and the risk of a crash is increased, a driver of the other vehicle behind can be informed of the risk so as to alert the driver to avoid the crash.

According to the sixth aspect, the risk of a crash between the vehicle and the object is accurately determined based on information of the accurately detected location of the object. Further, when another vehicle approaches from behind the vehicle, on which the in-vehicle radar device is mounted, and the risk of a crash is increased, an occupant protection device, for example, mounted on the vehicle is allowed to operate. Accordingly, even when the other vehicle behind actually crashes, an occupant is protected from a crash impact.

According to the seventh aspect, when the other vehicle behind actually crashes, a head of an occupant is protected so as to be prevented from a whiplash injury or the like.

According to the eighth aspect, the synthetic resin material, which is easily cast in a mold and inexpensive, can be used to construct the cover portion.

The radar cover described in the ninth aspect plays a part in the above-described in-vehicle radar device, thereby providing similar effects.

DESCRIPTION OF THE REFERENCE CHARACTERS

Figure 1:
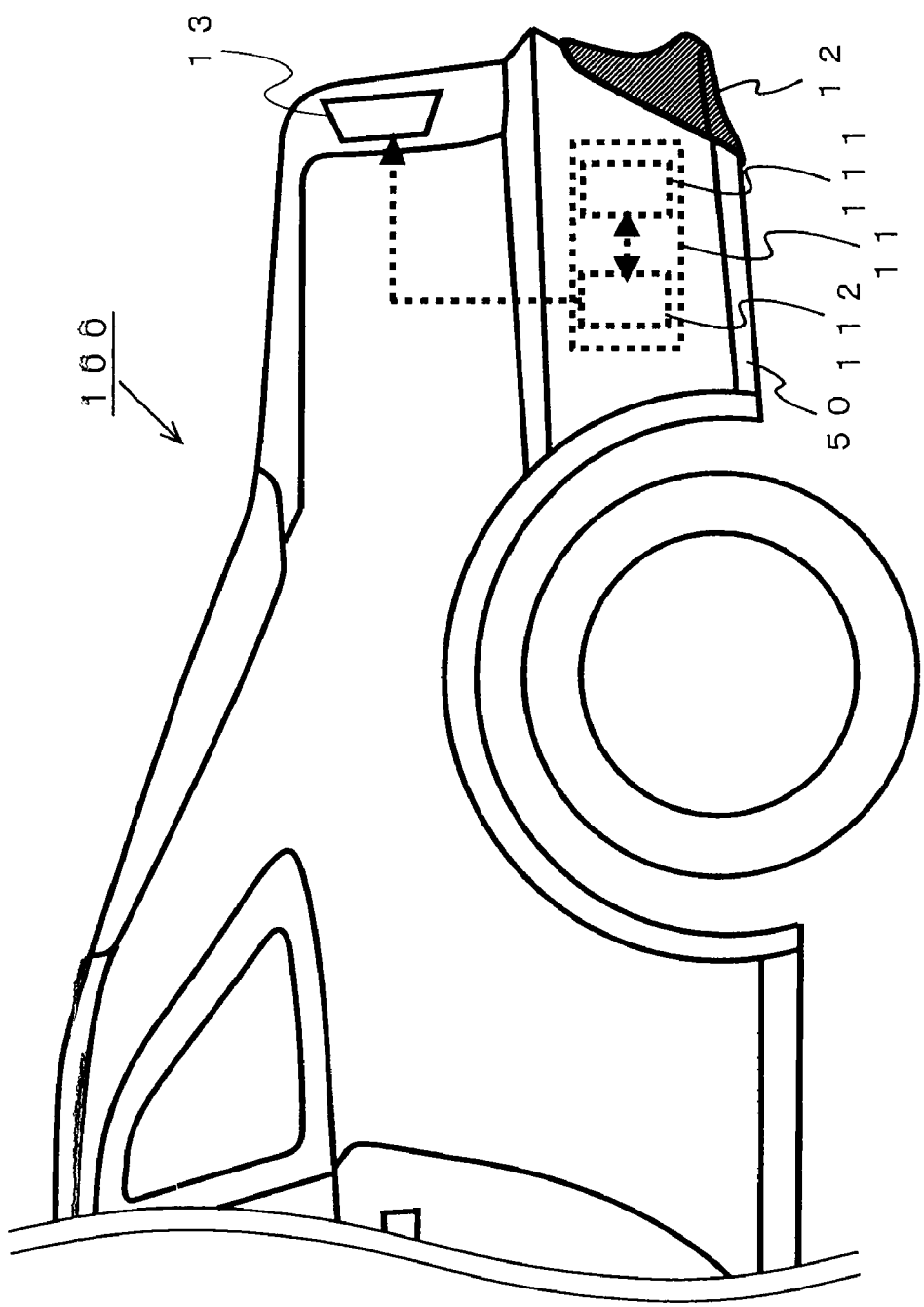
FIG. 1 is a diagram illustrating a configuration of an in-vehicle radar device according to a first embodiment, and a state where the in-vehicle radar device is mounted on a vehicle.

11, 61 radar unit
12, 22 radar cover
13 hazard lamp
50 rear bumper
62 radome portion
63 bumper
100 vehicle
111 antenna
112 processing unit

BEST MODE FOR CARRYING OUT THE INVENTION (First Embodiment)

An in-vehicle radar device according to a first embodiment of the present invention is described below. Initially, a configuration of the in-vehicle radar device according to the first embodiment is described with reference to FIG. 1. FIG. 1 is a diagram illustrating the configuration of the in-vehicle radar device according to the first embodiment, and a state where the in-vehicle radar device is mounted on a vehicle. In the following description, an example where the in-vehicle radar device is mounted on a vehicle 100 is described.

The in-vehicle radar device according to the first embodiment includes a radar unit 11 and a radar cover 12. The radar unit 11 is mounted on the vehicle 100 so as to be located inside a rear bumper 50 of the vehicle 100. In the rear bumper 50, an opening portion is formed through which electromagnetic waves transmitted from the radar unit 11 are transmitted. The radar cover 12 is attached to the rear bumper 50 so as to cover the opening portion of the above-described rear bumper 50. Here, any method may be used as a method for attaching the radar cover 12 to the rear bumper 50. For example, the radar cover 12 may be fixed to the rear bumper 50 by bolts, or the radar cover 12 may be attached to the rear bumper 50 by using an adhesive agent, an adhesive tape or the like.

The radar unit 11 includes an antenna 111 and a processing unit 112.

The antenna 111 is an antenna device which transmits electromagnetic waves, and receives reflected waves, obtained by reflection of the electromagnetic waves by an object. The antenna 111 is electrically connected with the processing unit 112, and outputs, to the processing unit 112, signals indicating phase information, intensity information, and the like of the received reflected waves. A transmission-and-reception portion described in claims corresponds to the antenna 111, for example.

The processing unit 112 is typically a control unit which includes, for example, an information-processing unit such as a CPU (Central Processing Unit) or the like, a storage device such as a memory or the like, and an interface circuitry. The processing unit 112 detects, based on the phase information, the intensity information, and the like of the reflected waves inputted through the antenna 111, a location of the object which has reflected the electromagnetic waves. Here, any conventionally known method can be used as a method in which the processing unit 112 detects the location of the object. The processing unit 112 is electrically connected to a hazard lamp 13 mounted on the vehicle 100. The processing unit 112 calculates a risk of a crash between the detected object and the vehicle 100, and when the risk of a crash between the detected object and the vehicle 100 is high, outputs, to the hazard lamp 13, an indication signal for making the hazard lamp 13 blink (see FIG. 6 described later).

The radar cover 12 is a member formed of a material through which the electromagnetic waves transmitted from and received by the antenna 111 are transmitted. For example, the radar cover 12 is molded by using a synthetic resin. A shape of the radar cover 12 is described below in detail with reference to FIG. 2, FIG. 3, and FIG. 4. A cover member described in claims corresponds to the radar cover 12, for example.

Figure 2:
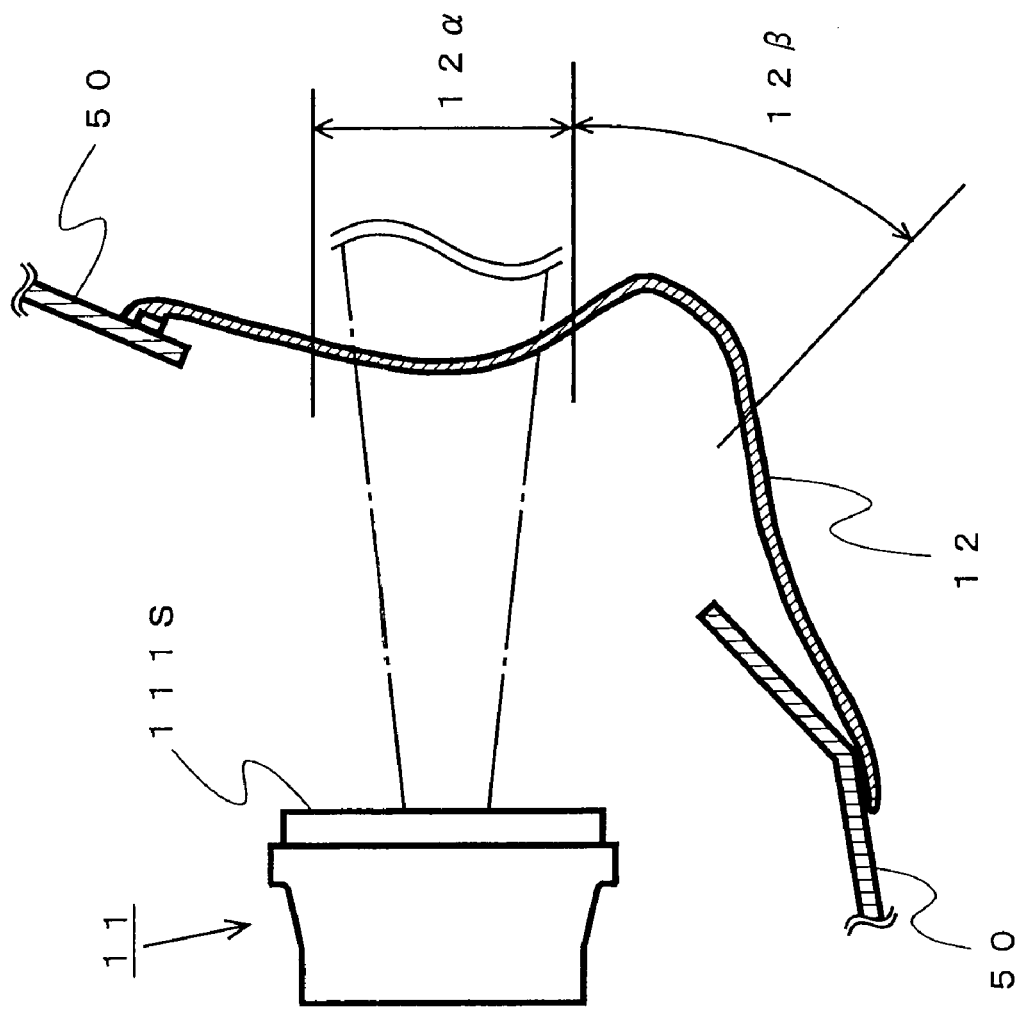
FIG. 2 is a vertical cross-sectional view of a radar cover, according to the first embodiment, mounted on the vehicle.

FIG. 2 is a vertical cross-sectional view of the radar cover 12, according to the first embodiment, mounted on the vehicle. As illustrated in FIG. 2, the radar cover 12 has a cover portion 12α and a lower protrusion portion 12β.

The cover portion 12α is a portion which covers a transmission-and-reception surface 111S at which the antenna 111 transmits and receives the electromagnetic waves. In FIG. 2, a propagation region of the above-described electromagnetic waves is indicated by a region enclosed by dashed lines. As illustrated in FIG. 2, the propagation region of the electromagnetic waves overlaps the radar cover 12 only in the cover portion 12α. That is, the electromagnetic waves transmitted from and received by the antenna 111 are propagated through the radar cover 12 at the cover portion 12α.

The lower protrusion portion 12β is a portion which is provided below the cover portion 12α and which protrudes on a surface side of the radar cover 12 with respect to the cover portion 12α.

Figure 3:
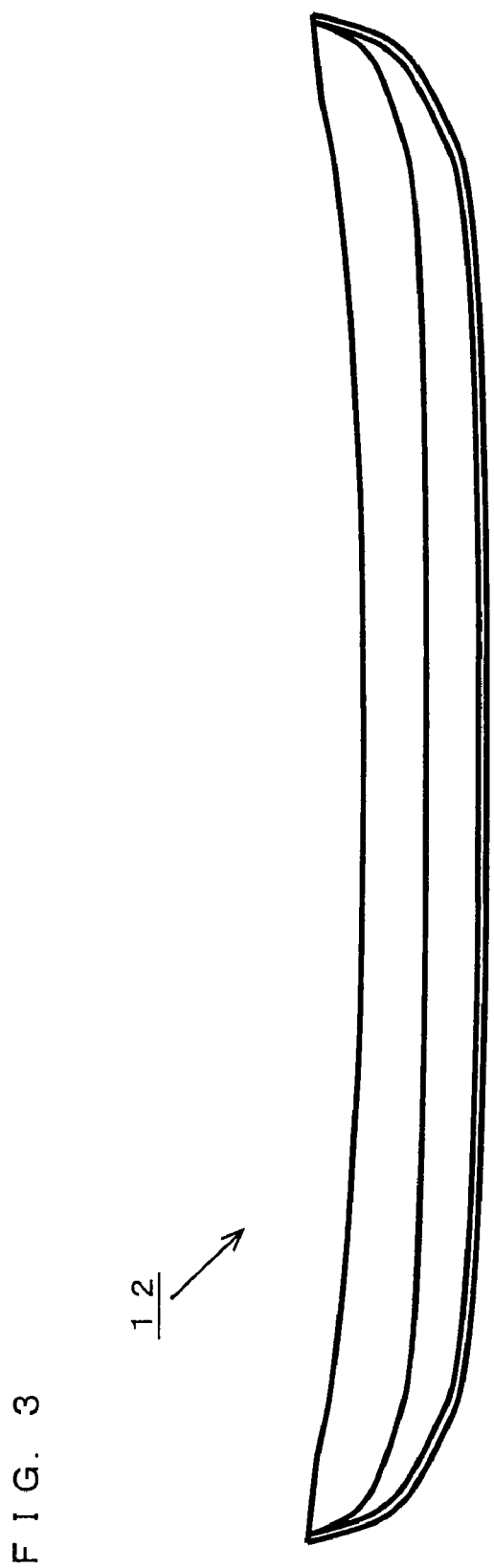
FIG. 3 is a top view of the radar cover according to the first embodiment.
Figure 4:
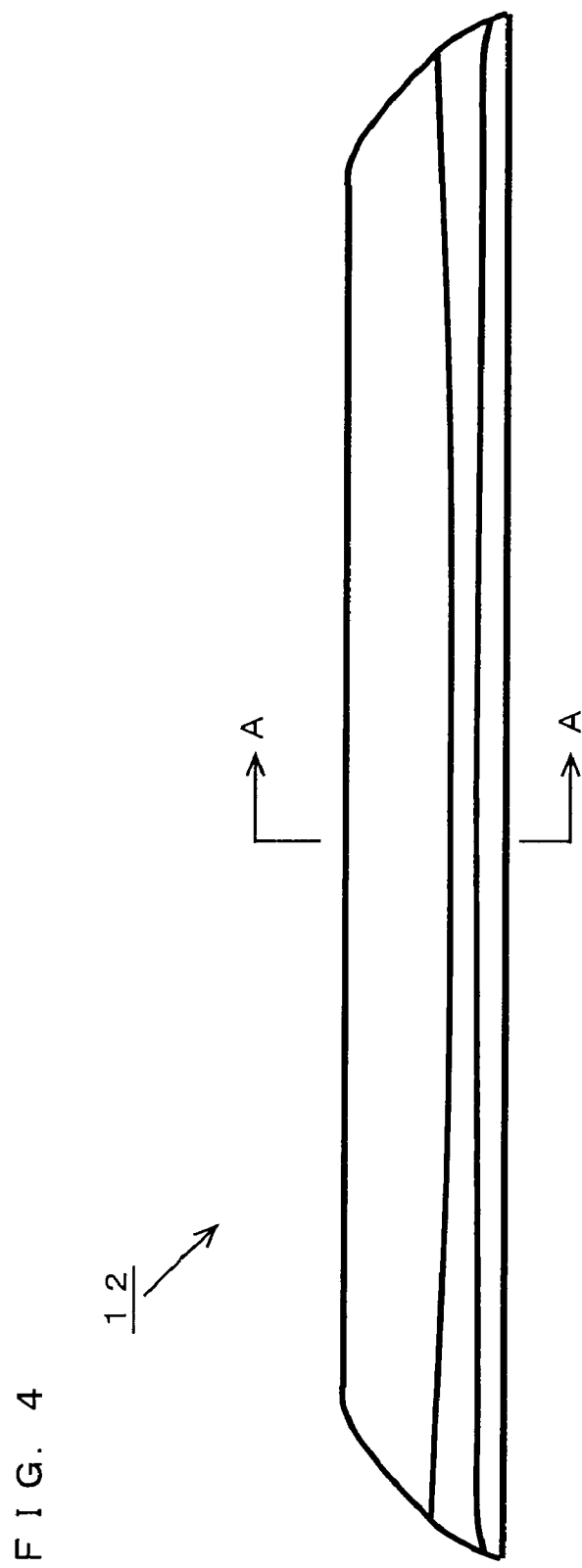
FIG. 4 is a front view of the radar cover according to the first embodiment.

FIG. 3 is a top view of the radar cover 12 according to the first embodiment. FIG. 4 is a front view of the radar cover 12 according to the first embodiment. As illustrated in FIG. 3 and FIG. 4, the radar cover 12 has a shape extending along the rear bumper 50 in a lateral direction of the vehicle 100. The lower protrusion portion 12β similarly has a wing-like shape extending along the rear bumper 50 in the lateral direction of the vehicle 100. Here, FIG. 2 is the cross-sectional view of the radar cover 12 illustrated in FIG. 4 along A-A.

The cover portion 12α and the lower protrusion portion 12β can be integrally formed by a molding method, for example, where a synthetic resin is injected into a mold. When the cover portion 12α and the lower protrusion portion 12β are integrally formed, the above-described radar cover 12 can be easily constructed at low cost. Alternatively, the cover portion 12α and the lower protrusion portion 12β may be separately formed and thereafter assembled so as to construct the above-described radar cover 12.

Owing to the above-described shape and mounted position, the radar cover 12 plays a role as a so-called rear under spoiler. That is, an excellent design and aerodynamic characteristics are provided by the radar cover 12. Further, owing to the above-described shape, the radar cover 12 is capable of preventing water drops and dirt coming from below from adhering to the cover portion 12α.

Figure 5:
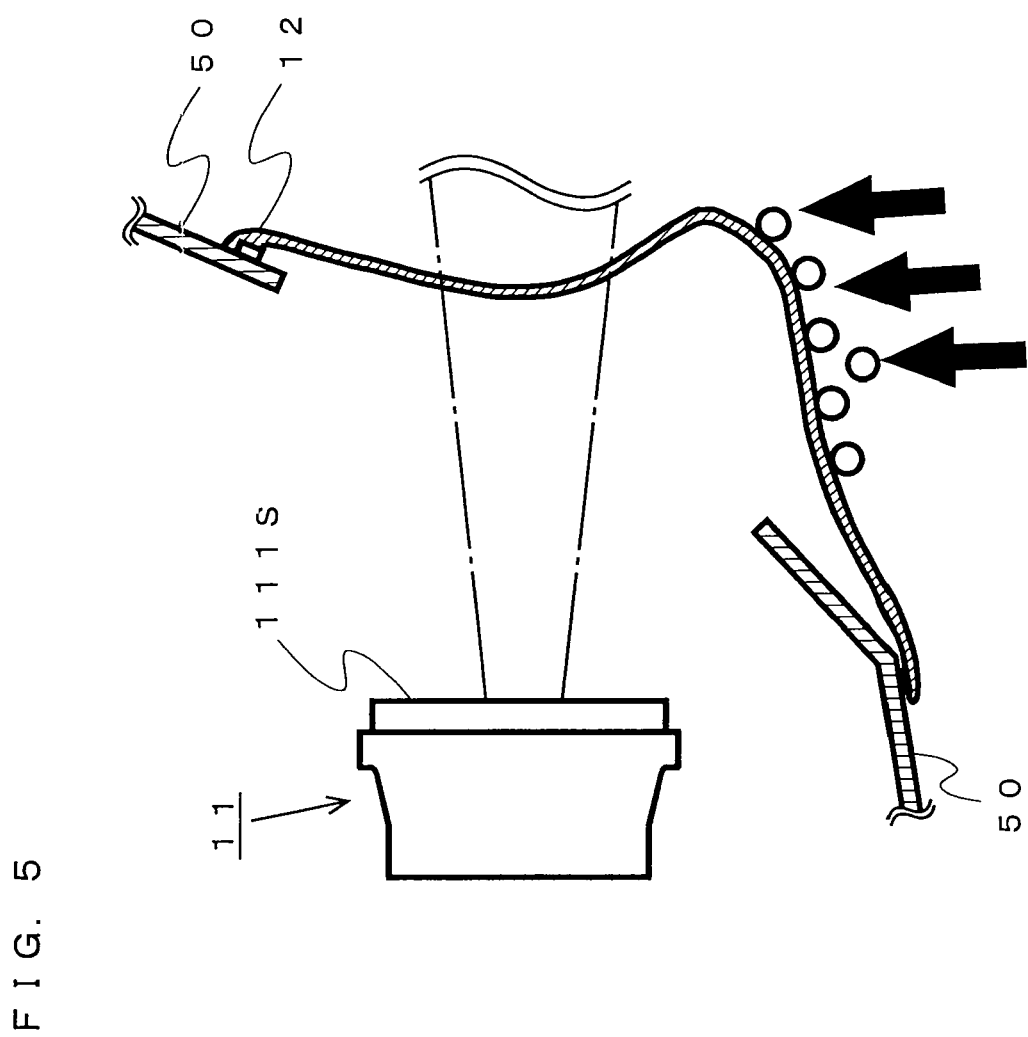
FIG. 5 is a diagram illustrating a state where water drops coming from below adhere to the radar cover according to the first embodiment.

A state where water drops and dirt are prevented from adhering to the cover portion 12α is described below with reference to FIG. 5. FIG. 5 is a diagram illustrating a state where water drops coming from below adhere to the radar cover 12 according to the first embodiment.

In FIG. 5, water drops are schematically represented as circles, and directions from which the water drops are coming are schematically represented by arrows. For example, when the vehicle 100 runs on a wet road, water drops are sometimes thrown up from below due to a wheel rotation, an aerodynamic force or the like. In such a case, the water drops thrown up from below the radar cover 12 adhere to an under surface of the lower protrusion portion 12β which protrudes on the surface side with respect to the cover portion 12α, so that the water drops do not adhere to the cover portion 12α which is located above and behind the lower protrusion portion 12β. That is, the lower protrusion portion 12β plays a role as a so-called mudguard, thereby preventing the water drops from adhering to the cover portion 12α.

As described above, the radar cover 12 according to the first embodiment of the present invention prevents the water drops from adhering to the cover portion 12α through which the electromagnetic waves transmitted from and received by the antenna 111 are transmitted, thereby preventing attenuation of the electromagnetic waves. Accordingly, the processing unit 112 accurately measures a propagation distance or the like of the electromagnetic waves, thereby accurately detecting the location of the object which has reflected the electromagnetic waves.

Figure 6:
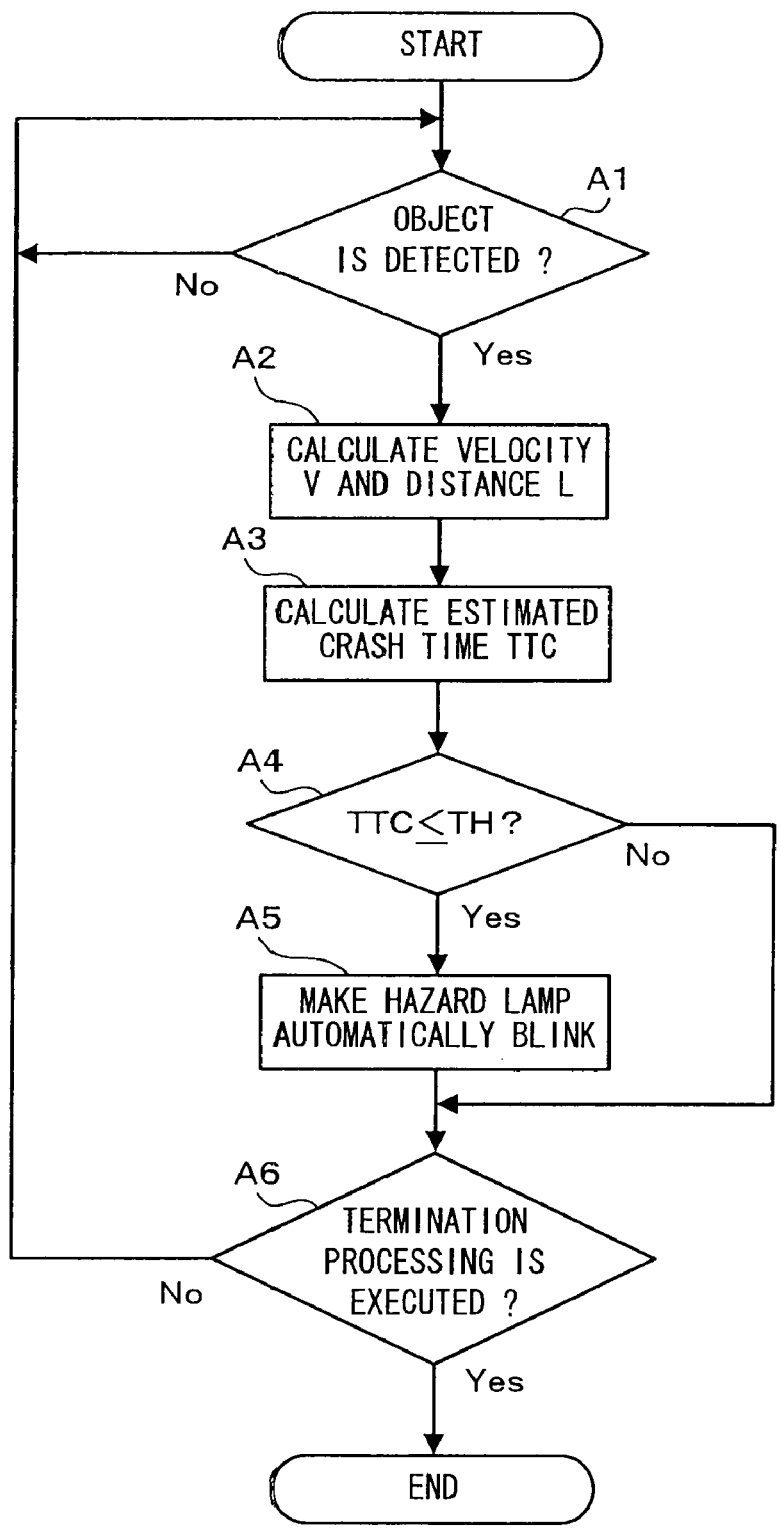
FIG. 6 is an exemplary flowchart illustrating processing executed by a processing unit 112.

The processing unit 112 determines the risk of a crash between the object and the vehicle 100 based on the detected location of the object. An example of processing executed by the processing unit 112 is described below with reference to FIG. 6. FIG. 6 is an exemplary flowchart illustrating the processing executed by the processing unit 112. The processing unit 112 starts the processing in step A1 of the flowchart illustrated in FIG. 6 when, for example, an ignition switch of the vehicle 100 is set to on.

In step A1, the processing unit 112 determines whether or not the object is detected. Specifically, the processing unit 112 determines whether or not signals indicating phase information and intensity information of reflected waves are received from the antenna 111. Hereinafter, the object detected in step A1 is referred to as a detected object. When determining that the object is detected, the processing unit 112 proceeds the processing to step A2. On the other hand, when determining that the object is not detected, the processing unit 112 returns the processing to step A1.

Based on processing in step A1, the processing unit 112 waits for execution of processing from step A2 to step A6 until the object is detected.

In step A2, the processing unit 112 calculates a velocity V and a distance L. The velocity V is a relative velocity between the detected object and the vehicle 100. The distance L is a distance from the vehicle 100 to the detected object. The processing unit 112 calculates the distance L and the velocity V based on the phase information and the intensity information of the reflected waves. Here, any conventionally known method can be used as a calculation method of the distance L and the velocity V. When processing in step A2 is completed, the processing unit 112 proceeds the processing to step A3.

In step A3, the processing unit 112 calculates a crash estimated time TTC. The crash estimated time TTC is a time which is estimated to be taken until the detected object crashes into the vehicle 100. The processing unit 112 calculates the crash estimated time TTC based on the following equation (1).

$$TTC = L/V \qquad (1)$$

When processing in step A3 is completed, the processing unit 112 proceeds the processing to step A4.

In step A4, the processing unit 112 determines whether or not the crash estimated time TTC is equal to or less than a threshold value TH. The threshold value TH is a constant preliminarily stored in the storage of the processing unit 112, and is a reference value for determining whether or not the risk of a crash between the detected object and the vehicle 100 is high. When determining that the crash estimated time TTC is equal to or less than the threshold value TH, in other words, when determining that the risk of a crash between the detected object and the vehicle 100 is high, the processing unit 112 proceeds the processing to step A5 so as to make the hazard lamp 13 blink. On the other hand, when determining that the crash estimated time TTC is greater than the threshold value TH, in other words, when determining that the risk of a crash between the detected object and vehicle 100 is low, the processing unit 112 proceeds the processing to step A6 skipping processing in step A5.

In step A5, the processing unit 112 makes the hazard lamp 13 automatically blink. Specifically, the processing unit 112 outputs, to the hazard lamp 13, an indication signal for making the hazard lamp 13 blink. When receiving the above-described indication signal, the hazard lamp 13 blinks. When processing in step A5 is completed, the processing unit 112 proceeds the processing to step A6.

In step A6, the processing unit 112 determines whether or not termination processing is executed. Specifically, the processing unit 112 determines, for example, whether or not the ignition switch of the vehicle 100 is set to off. When determining that the termination processing is executed, the processing unit 112 terminates the processing of the flowchart illustrated in FIG. 6. On the other hand, when determining that the termination processing is not executed, the processing unit 112 returns the processing to step A1 and repeatedly executes the above-described processing.

Based on the processing from step A2 to step A5 executed by the processing unit 112, whether or not the risk of a crash between the vehicle 100 and the vehicle behind is high is determined, and when the risk of a crash between the vehicle 100 and the detected object is high, the hazard lamp 13 is made to blink so as to inform a driver in the vehicle behind of the risk of a crash, for example. Further, the radar cover 12 allows the location of the object to be accurately detected, so that the processing unit 112 is capable of accurately detecting the risk of a crash between the vehicle 100 and the vehicle behind. Note that risk of a crash determination section described in claims corresponds, for example, to the processing from step A2 to step A4 executed by the processing unit 112. Further, information section described in claims corresponds, for example, to the processing in step A5 executed by the processing unit 112 and the hazard lamp 13.

(Second Embodiment)

In the above-described first embodiment, an example where the radar cover 12 has the lower protrusion portion 12β, which is formed so as to protrude on a surface side of the radar cover 12, below the cover portion 12α. However, the radar cover 12 may be constructed in a form further having a protrusion portion above the cover portion 12α.

Figure 7:
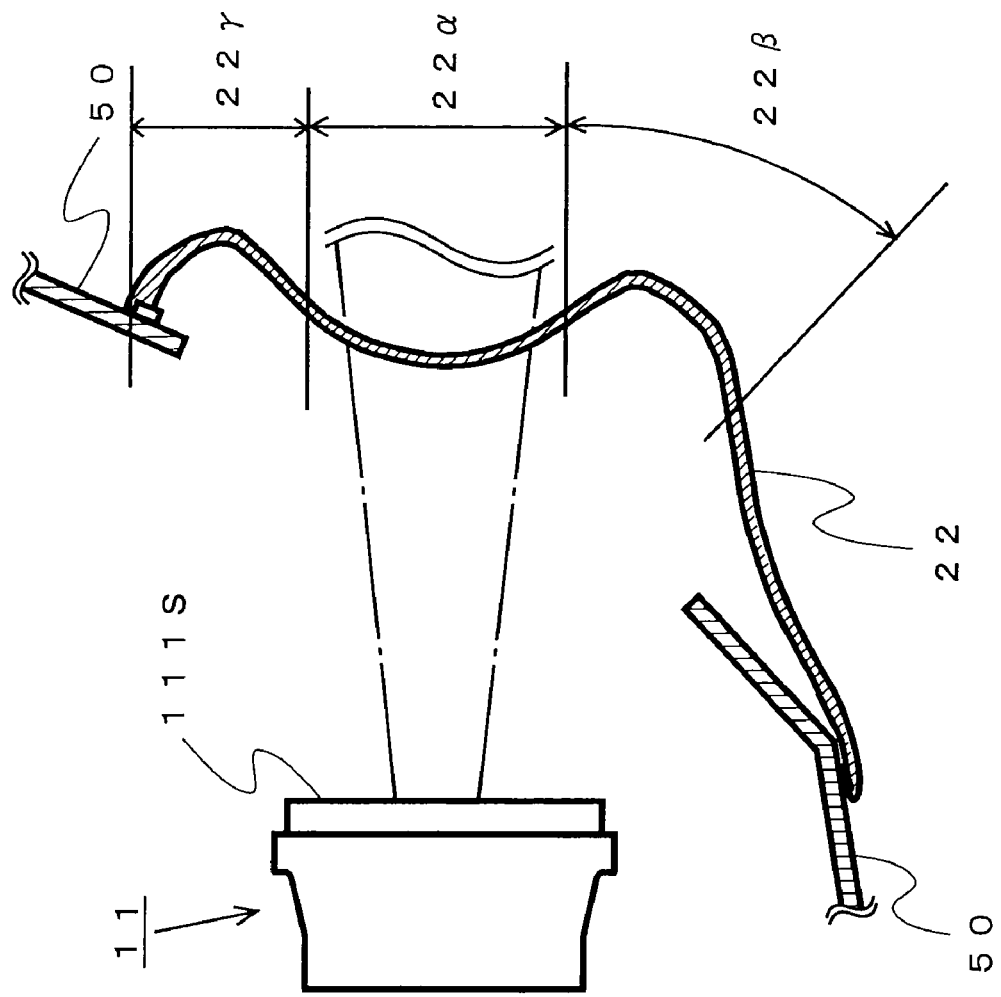
FIG. 7 is a cross-sectional view of a radar cover, according to a second embodiment, mounted on a vehicle.

FIG. 7 is a sectional view of a radar cover 22, which is mounted on a vehicle, according to a second embodiment. As illustrated in FIG. 7, the radar cover 22 according to the second embodiment has a cover portion 22α, a lower protrusion portion 22β, and an upper protrusion portion 22γ. The cover portion 22α is a portion which has a function similar to that of the cover portion 12α, and the lower protrusion portion 22β is a portion which has a function similar to that of the lower protrusion portion 12β, and detailed description of the cover portion 22α and the lower protrusion portion 22β is omitted.

The upper protrusion portion 22γ is a portion which is provided above the cover portion 22α and protrudes on the surface side of the radar cover 22 with respect to the cover portion 22α. The radar cover 22 has the upper protrusion portion 22γ, thereby preventing water drops and dirt coming from above from adhering to the cover portion 22α.

Figure 8:
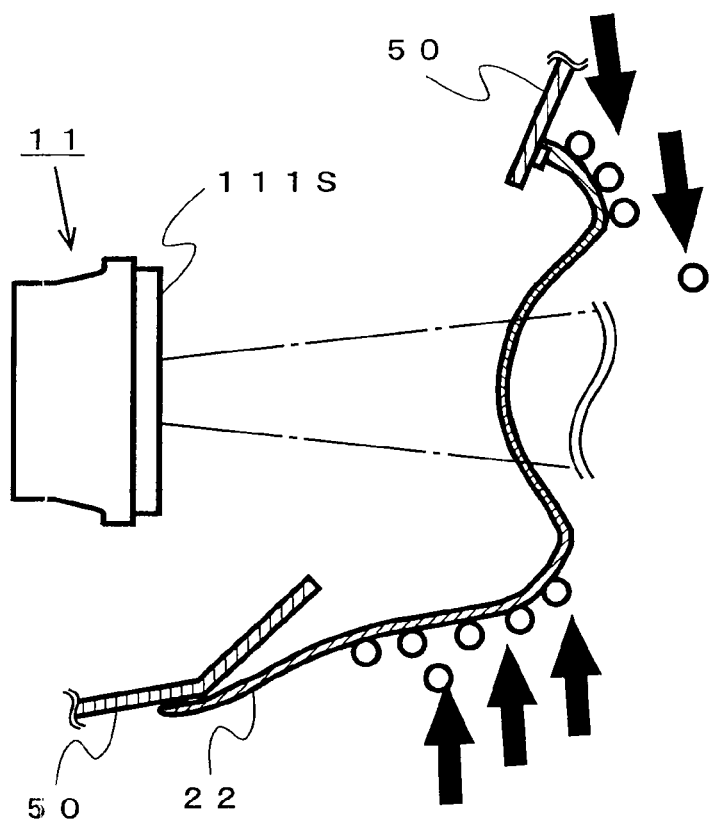
FIG. 8 is a diagram illustrating a state where water drops coming from below and above adhere to the radar cover according to the second embodiment.
Figure 9:
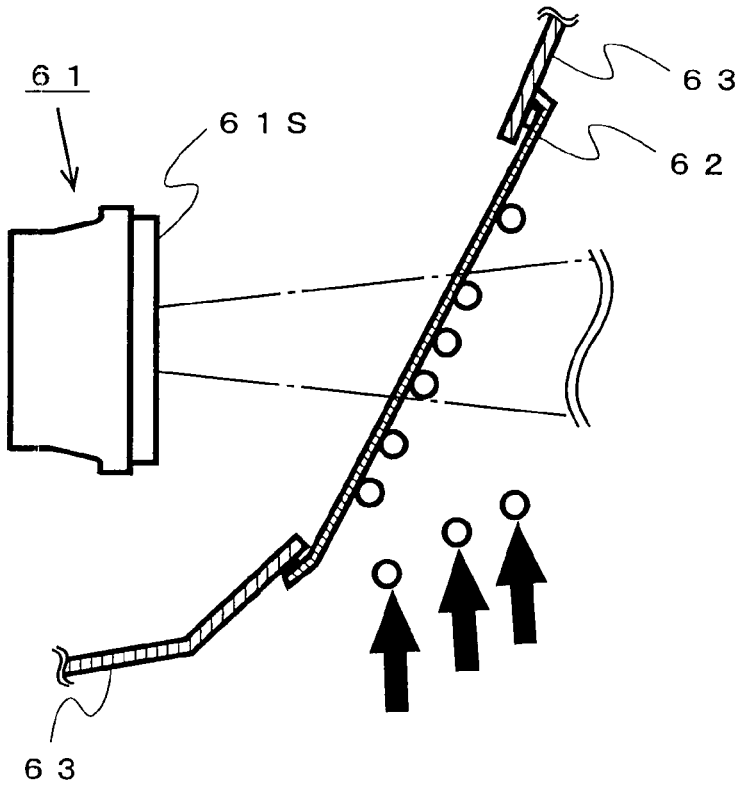
FIG. 9 is a diagram illustrating a state where water drops coming from below adhere to a radome portion of a conventional radar device mounted on the rear of a vehicle.

A state where water drops and dirt are prevented from adhering to the cover portion 22α is described below with reference to FIG. 8. FIG. 8 is a diagram illustrating a state where water drops coming from below and above adhere to the radar cover 22 according to the second embodiment.

In FIG. 8, water drops are schematically represented as circles, and directions from which the water drops are coming are schematically represented by arrows. For example, when it rains, rain drops fall from above the vehicle 100. Here, the rain drops coming from above adhere to an upper surface of the upper protrusion portion 22γ which protrudes on a surface side with respect to the cover portion 22α, whereby the water drops do not adhere to the cover portion 22α which is located below and behind the upper protrusion portion 22γ. That is, the upper protrusion portion 22γ plays a role as a so-called rain visor so as to prevent the water drops from adhering to the cover portion 22α.

Further, when the vehicle 100 runs in the rain, water drops are sometimes thrown up from below due to a wheel rotation, an aerodynamic force or the like. As described in the first embodiment, the water drops coming from below the radar cover 22 are prevented by the lower protrusion portion 22β from adhering to the cover portion 22α.

As described above, the radar cover 22 according to the second embodiment of the present invention is capable of preventing the water drop coming from above from adhering to the cover portion 22α as well as the water drops coming from below. Accordingly, the radar cover 22, as well as the radar cover 12 according to the first embodiment, prevents the water drops from adhering to the cover portion 22α through which the electromagnetic waves that are transmitted from and received by the antenna 111 are transmitted, thereby preventing attenuation of the electromagnetic waves. Consequently, the processing unit 112 accurately measures a propagation distance and a propagation direction of the electromagnetic waves so as to accurately detect a location of an object which reflects the electromagnetic waves.

In the above-described first embodiment and second embodiment, an example is described where the radar cover 12 is attached to the rear bumper 50 so as to cover the antenna 111. However, a mounting place is not limited to the rear bumper 50 as long as the radar cover 12 is mounted on the vehicle so as to cover the transmission-and-reception surface 111S with the cover portion 12α. For example, when a vehicle on which the radar cover is to be mounted is a vehicle having a back door, the radar cover may be mounted on an upper portion of the back door as a rear roof spoiler.

Further, in the first embodiment and the second embodiment, an example is described where when the risk of a crash between the vehicle 100 and the detected object is high, the processing unit 112 performs control for making the hazard lamp 13 blink. Alternatively, the processing unit 112 may make another in-vehicle device such as an occupant protection device or the like which is mounted on the vehicle 100 operate. For example, when the vehicle 100 is equipped with a headrest having a drive mechanism which is electrically movable in a front-back direction of the vehicle, the processing unit 112 performs control to protect an occupant by operating the drive mechanism of the headrest. Specifically, in the processing in the above-described step A5, the processing unit 112 makes the headrest move forward until the headrest touches the head of the occupant so as to protect the head of the occupant. Owing to such control, the occupant is protected from the crash impact and prevented from a whiplash injury or the like.

Industrial Applicability

The in-vehicle radar device and the cover for the in-vehicle radar device according to the present invention are useful as, for example, an in-vehicle radar device, a cover for the in-vehicle radar device which are capable of accurately detecting an object.

The invention claimed is:

1. An in-vehicle radar device which radiates electromagnetic waves and receives reflected waves, from an object, of the electromagnetic waves so as to detect a location of the object and which is mounted on a rear of a vehicle, the in-vehicle radar device comprising:
   a transmission-and-reception section that transmits the electromagnetic waves and receives the reflected waves;
   a detection section that detects the location of the object based on the reflected waves; and
   a cover member that is provided below a rear bumper of the vehicle and that covers the transmission-and-reception section in a manner that a rear surface of the cover member faces a transmission-and-reception surface of the transmission-and-reception section so as to be spaced apart therefrom, wherein
   the cover member includes at least
      a cover portion that is formed from a material through which electromagnetic waves are transmitted and that covers the transmission-and-reception surface, and
      a lower protrusion portion that is provided below the cover portion and formed so as to protrude beyond a surface side of the cover member with respect to the cover portion, the lower portion having a convex shape and the cover portion having a concave shape.

2. The in-vehicle radar device according to claim 1, wherein the cover member further includes an upper protrusion portion which is provided above the cover portion and formed to protrude on the surface side of the cover member with respect to the cover portion.

3. The in-vehicle radar device according to claim 2, wherein the cover portion, the lower protrusion portion, and the upper protrusion portion are integrally formed.

4. The in-vehicle radar device according to claim 1, further comprising:
   a crash risk determination section that determines whether or not a risk of a crash between the object and the vehicle is high based on the detected location of the object; and
   an information section that provides information to rearward of the vehicle of the risk of a crash when the risk of a crash between the object and the vehicle is determined to be high.

5. The in-vehicle radar device according to claim 1, further comprising:
   a crash risk determination section that determines whether or not a risk of crash between the object and the vehicle is high based on the detected location of the object; and
   an occupant protection section that protects an occupant in the vehicle from the risk of a crash when the risk of crash between the object and the vehicle is determined to be high.

6. The radar device according to claim 5, wherein the occupant protection section protects the occupant from a crash impact when the risk of crash between the object and the vehicle is determined to be high, by making a headrest equipped on the vehicle move forward so as to support the head of the occupant.

7. The in-vehicle radar device according to claim 1, wherein the cover portion is molded from a synthetic resin through which the electromagnetic waves are transmitted.

* * * * *